(12) United States Patent
Park et al.

(10) Patent No.: US 10,407,820 B2
(45) Date of Patent: Sep. 10, 2019

(54) SPIKE FIXING MEMBER AND CLOTH TREATING APPARATUS HAVING THE SAME

(71) Applicant: LG ELECTRONICS INC., Seoul (KR)

(72) Inventors: Juwan Park, Seoul (KR); Sunghoo Park, Seoul (KR); Sunyong Kim, Seoul (KR); Jumin Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 113 days.

(21) Appl. No.: 15/344,646

(22) Filed: Nov. 7, 2016

(65) Prior Publication Data
US 2017/0130390 A1    May 11, 2017

(30) Foreign Application Priority Data
Nov. 6, 2015  (KR) .................. 10-2015-0156163

(51) Int. Cl.
| | | |
|---|---|---|
| *D06F 73/02* | (2006.01) | |
| *F25D 21/14* | (2006.01) | |
| *D06F 29/00* | (2006.01) | |
| *A47G 27/04* | (2006.01) | |
| *D06F 58/20* | (2006.01) | |
| *F16M 7/00* | (2006.01) | |

(52) U.S. Cl.
CPC ............ *D06F 73/02* (2013.01); *F25D 21/14* (2013.01); *A47G 27/04* (2013.01); *D06F 29/00* (2013.01); *D06F 58/20* (2013.01); *F16M 7/00* (2013.01)

(58) Field of Classification Search
CPC ........ D06F 73/02; D06F 58/10; D06F 29/005; D06F 29/00; A47G 27/04; F25D 21/14
USPC ............................ 312/116, 122, 293.3, 351.3
See application file for complete search history.

(56) References Cited

U.S. PATENT DOCUMENTS

| | | | | |
|---|---|---|---|---|
| 2,902,794 A | * | 9/1959 | Ehrgott ................. | A47B 91/12 248/188.9 |
| 4,471,537 A | * | 9/1984 | Meda ..................... | A23N 12/08 34/225 |

(Continued)

FOREIGN PATENT DOCUMENTS

| | | |
|---|---|---|
| CN | 101201531 | 6/2008 |
| CN | 101858478 | 10/2010 |

(Continued)

OTHER PUBLICATIONS

Machine translation of DE 102005026134 A1, dated Dec. 2006. (Year: 2006).*

(Continued)

*Primary Examiner* — Joseph L. Perrin
*Assistant Examiner* — Kevin G Lee
(74) *Attorney, Agent, or Firm* — Ked & Associates, LLP

(57) ABSTRACT

A spike fixing member includes a coupling portion provided at a lower surface of a home appliance and coupled to a lower end of a leg for supporting the home appliance; and a plurality of spikes formed to extend downward from a lower surface of the coupling portion and configured to transpierce and be inserted into carpet provided at an indoor space, and a cloth treating apparatus having the spike fixing member. A home appliance is enabled to be stably installed at a soft indoor floor surface such as carpet.

12 Claims, 13 Drawing Sheets

(56) References Cited

U.S. PATENT DOCUMENTS

| | | | | |
|---|---|---|---|---|
| 5,555,640 A * | 9/1996 | Ou | ............................ | A47L 19/00 |
| | | | | 211/133.6 |
| 2005/0139738 A1* | 6/2005 | Hwang | .................. | D06F 29/00 |
| | | | | 248/188.1 |
| 2005/0204755 A1 | 9/2005 | Nishiwaki et al. | | |
| 2010/0058813 A1 | 3/2010 | Moon et al. | | |
| 2014/0138509 A1* | 5/2014 | Lehman | ................. | A47B 91/12 |
| | | | | 248/346.11 |
| 2015/0197882 A1 | 7/2015 | Ahn et al. | | |

FOREIGN PATENT DOCUMENTS

| | | | | |
|---|---|---|---|---|
| CN | 204050828 | | 12/2014 | |
| CN | 204315174 | | 5/2015 | |
| DE | 102005026134 A1 * | | 12/2006 | ............ D06F 29/00 |
| JP | H05-49519 | | 3/1993 | |
| JP | H 06-159907 | | 6/1994 | |
| JP | 3070743 | | 5/2000 | |
| JP | 2004-116899 | | 4/2004 | |
| JP | 2007-313027 | | 12/2007 | |
| JP | 2013-166412 | | 8/2013 | |
| KR | 10-2009-0102400 | | 9/2009 | |
| KR | 10-2015-0042948 | | 4/2015 | |
| KR | 20150059414 A | * | 6/2015 | |
| KR | 10-2015-0085728 | | 7/2015 | |
| WO | WO-2016155801 A1 * | | 10/2016 | ........... D06F 29/005 |

OTHER PUBLICATIONS

Samsung Refrigerator Model RF195AB Service Manual (2008). (Year: 2008).*

Japanese Office Action dated Sep. 5, 2017 issued in Application No. 2016-216452.

Chinese Office Action (with English translation) dated Aug. 22, 2018 issued in CN Application No. 201611026961.5.

* cited by examiner

SPIKE FIXING MEMBER AND CLOTH TREATING APPARATUS HAVING THE SAME

CROSS-REFERENCE TO RELATED APPLICATION(S)

The application claims priority under 35 U.S.C. § 119 and 35 U.S.C. § 365 to Korean Patent Application No. 10-2015-0156163, filed in Korea on Nov. 6, 2015, whose entire disclosure is hereby incorporated by reference.

BACKGROUND

1. Field

A spike fixing member and a cloth treating apparatus having the same are disclosed herein.

2. Background

Recently, various kinds of cloth treating apparatuses other than washing machines have been developed and used. Representatively, there is a cloth treating apparatus having various functions of drying washed clothes, removing wrinkles in clothes by applying hot air or water, removing a smell remaining on the clothes, and so on. The cloth treating apparatus may be variously referred to as a cloth managing apparatus, a refresher, or a styler.

In Korean Patent Publication No. 10-2015-0085728, there is disclosed a cloth treating apparatus having a structure in which dried air heated while passing through a condenser by driving of a heat pump including a compressor, the condenser, an evaporator, and an expander may be supplied to a cloth accommodation space and dries clothes, and moist air in the cloth accommodation space may be dehumidified and cooled while passing through the evaporator and then circulated while passing through the condenser. Condensate water generated while the air passes through the evaporator may be collected in a container. In Korean Patent Publication No. 10-2009-0102400, there is disclosed a cloth treating apparatus in which a steam generating unit and a steam spraying unit for spraying steam into a cloth accommodation space are provided to remove wrinkles of accommodated clothes and to enhance deodorization performance.

The cloth treating apparatus having such a structure may be provided at an indoor space. When the cloth treating apparatus is provided at the indoor space, a horizontal control thereof is essential for a normal operation of the cloth treating apparatus. To this end, a leg which adjusts a height may be provided at a lower surface of a cabinet of the steam generating unit.

A representative structure of the leg is disclosed in Korean Patent Publication No. 10-2015-0042948. The structure of the leg may adjust the height and may have a vibration preventing member to reduce the vibration.

However, when the cloth treating apparatus is provided an indoor space on which carpet is spread, it may be difficult to stably fix the cloth treating apparatus. If it is impossible to stably fix the cloth treating apparatus, vibration may occur when the cloth treating apparatus is operated. The above references are incorporated by reference in their entirety herein where appropriate for appropriate teachings of additional or alternative details, features and/or technical background.

BRIEF DESCRIPTION OF THE DRAWINGS

The embodiments will be described in detail with reference to the following drawings in which like reference numerals refer to like elements wherein.

DETAILED DESCRIPTION

Reference will now be made in detail to the embodiments of the present disclosure, examples of which are illustrated in the accompanying drawings. The disclosure may, however, be embodied in many different forms and should not be construed as being limited to the embodiments set forth herein; rather, alternative embodiments included in other retrogressive disclosure or falling within the spirit and scope of the present disclosure can easily be derived through adding, altering, and removing, and will fully convey the concept of the disclosure to those skilled in the art.

In the embodiment of the present disclosure, for convenience of explanation and understanding, a cloth treating apparatus among various home appliances will be described as an example. However, the present disclosure may also be applied to other home appliances, such as a washing machine and a refrigerator, each of which has a leg structure.

Figure 1:
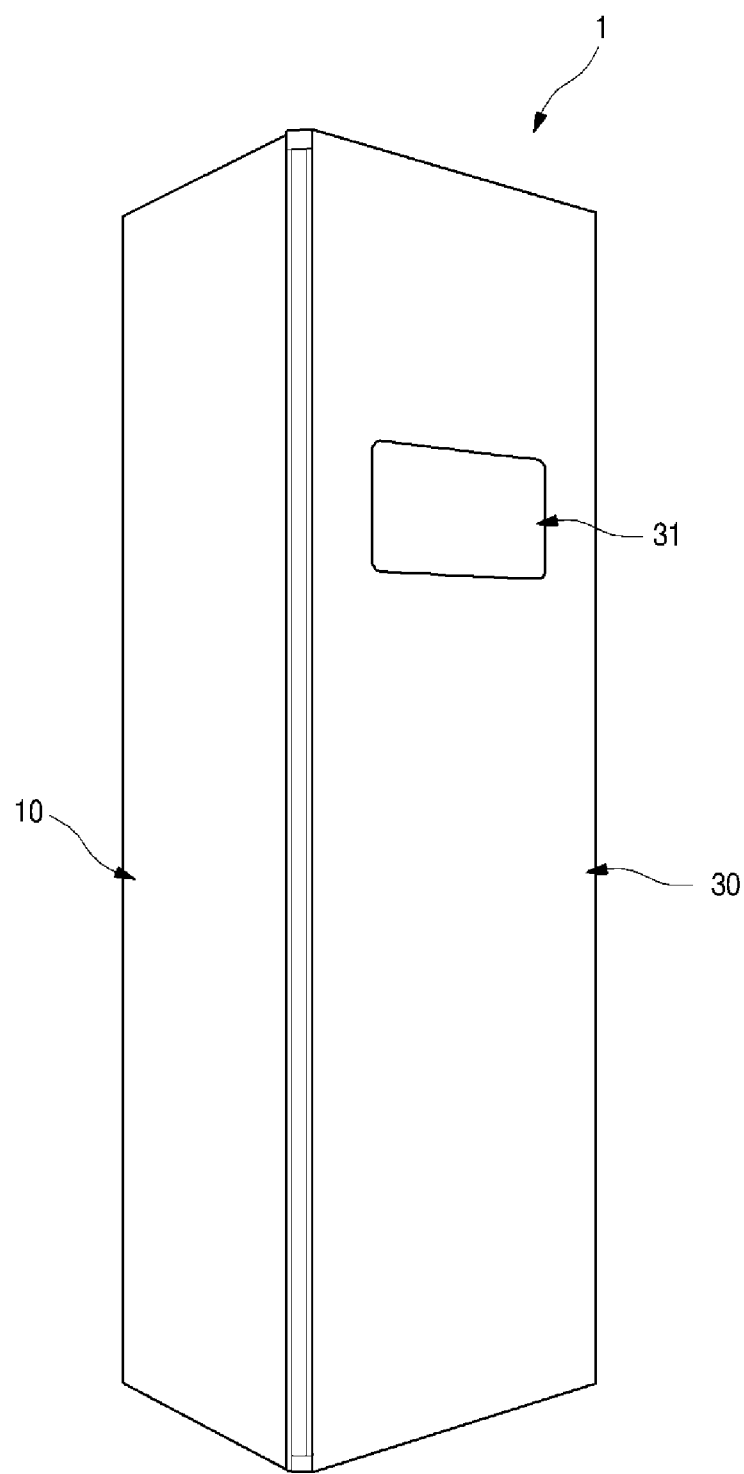
FIG. 1 is a perspective view of a cloth treating apparatus according to an embodiment of the present disclosure.
Figure 2:
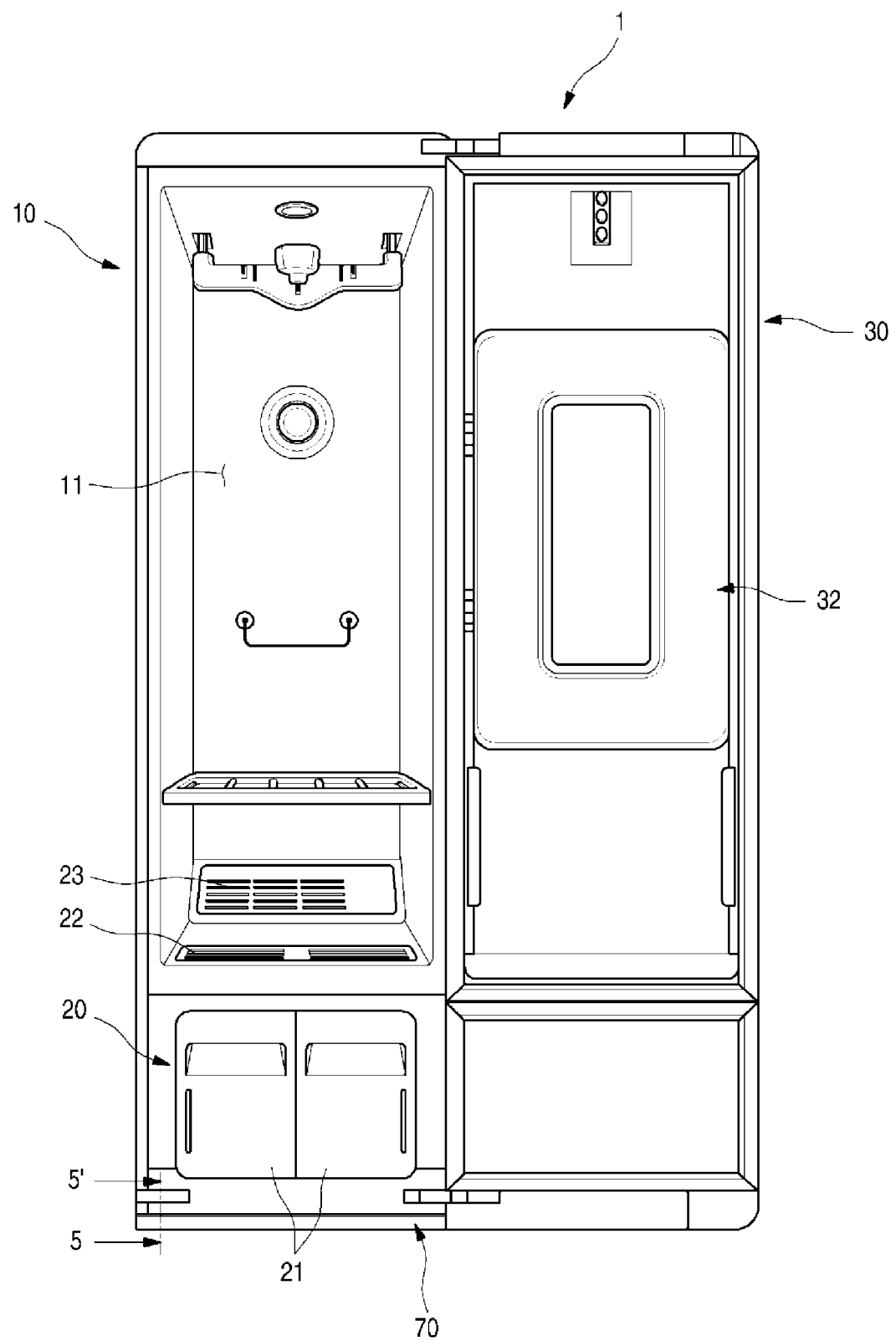
FIG. 2 is a front view illustrating a state in which a door of the cloth treating apparatus is opened.

As illustrated in FIGS. 1 and 2, an exterior of a cloth treating apparatus 1 according to an embodiment may include a cabinet 10 which forms a cloth accommodation space 11 therein and a door 30 which opens and closes the cabinet 10. The cabinet 10 may be formed so that a front surface thereof is opened, and various elements for accommodating clothes may be arranged inside the cloth accommodation space 11. A machinery chamber 20 may be formed under the cloth accommodation space 11. Specifically, a compressor, a condenser, an evaporator, and an expander which form a refrigeration cycle may be provided inside the machinery chamber 20, and a fan for flowing air may also be provided. A steam generating unit may be further provided.

A machinery chamber door 21 may be provided at a front surface of the machinery chamber 20 to open and close an inside of the machinery chamber 20. An air inlet 22 and an air outlet 23 may be formed at an upper surface of the machinery chamber 20 and may also continuously supply dried and heated air into the cloth accommodation space 11.

Various elements for accommodating the clothes, such as a tray and a rack, may be provided inside the cloth accommodation space 11.

The door 30 may be rotatably installed at the cabinet 10 to open and close the cabinet 10 by rotation thereof. A display 31 to display an operation of the cloth treating apparatus 1 may be provided at a front surface of the door 30. The display 31 may be formed as a touch type not only to display the operation of the cloth treating apparatus 1 but also to regulate the operation of the cloth treating apparatus 1. An operating part to operate the cloth treating apparatus 1 may be separately provided at the door 30. Also, a presser 32 which is opened and closed to remove wrinkles of the clothes or to fix set wrinkles using hot air and steam supplied to the cloth accommodation space 11 may be provided at a rear surface of the door 30.

Figure 3:
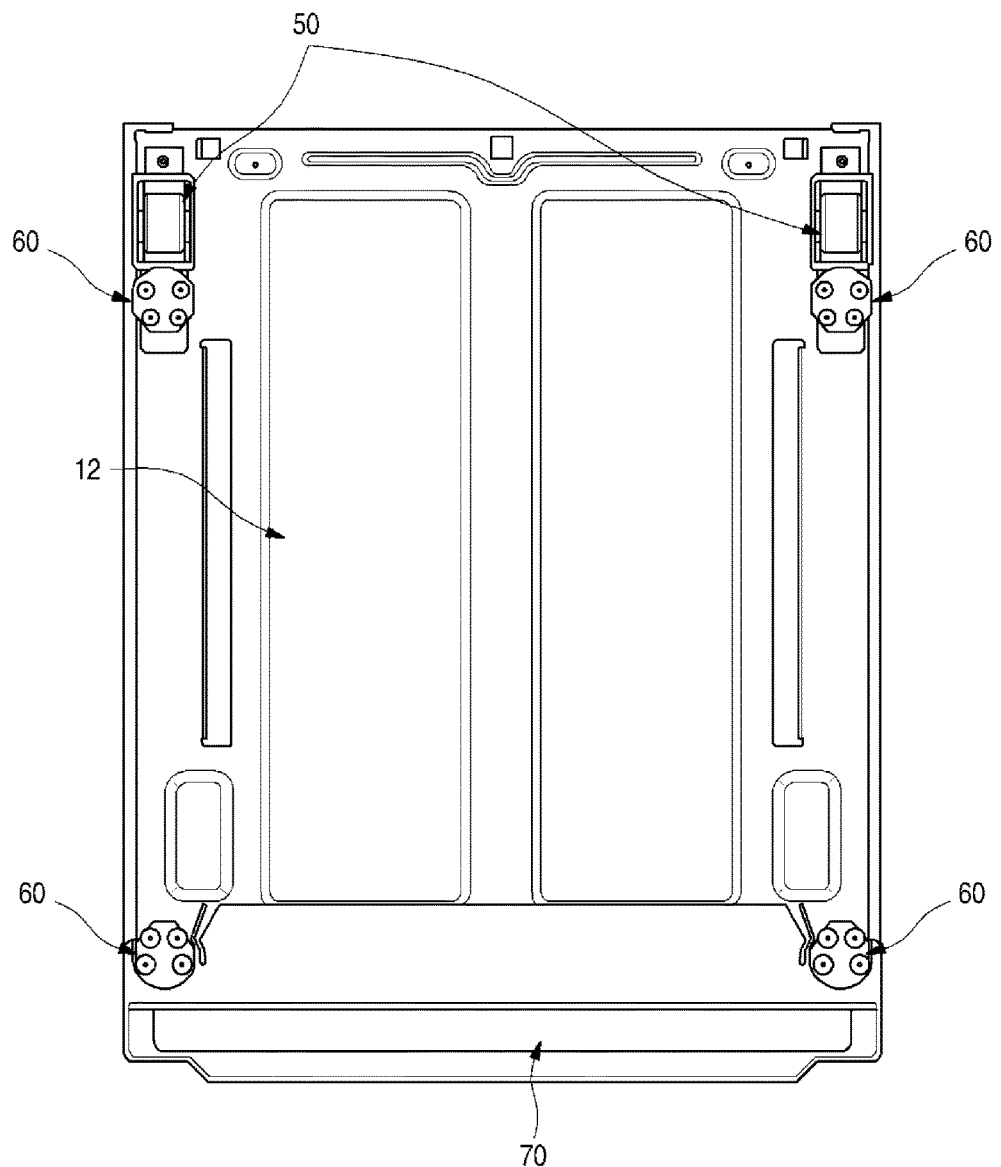
FIG. 3 is a bottom view illustrating the cloth treating apparatus.
Figure 4:
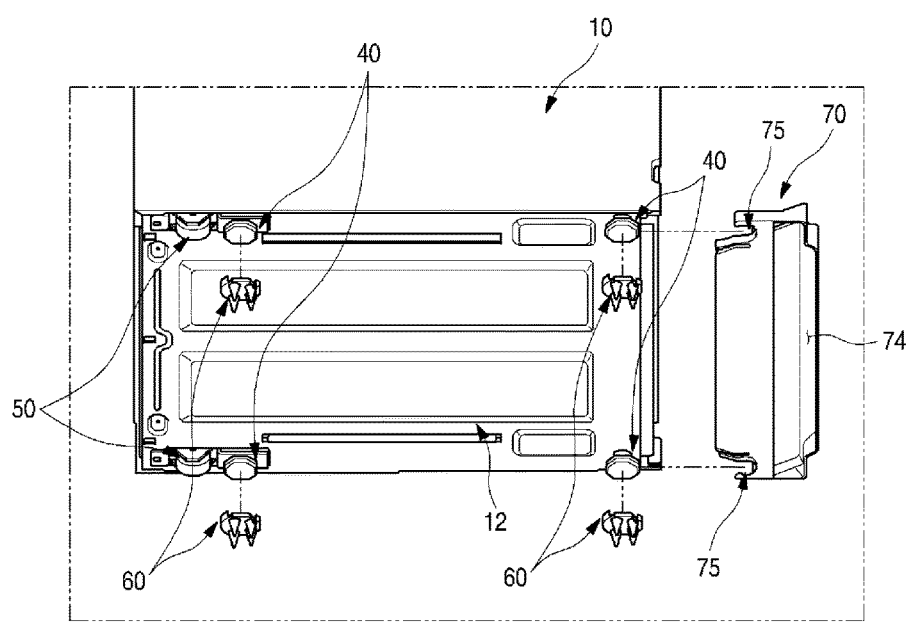
FIG. 4 is an exploded perspective view illustrating a coupling structure between a water tray and a spike fixing member of the cloth treating apparatus.

As illustrated in FIGS. 3 and 4, a base plate 12 may be formed at a lower surface of the cabinet 10. The base plate 12 may form a lower surface of the cloth treating apparatus 1, and a leg 40 may be provided at each of four corners of the base plate 12 so that the base plate 12 is spaced apart from a floor surface.

A roller 50 may be provided at both sides of a rear end of the base plate 12. The roller 50 may be used when the cloth treating apparatus 1 is moved and formed to protrude from the base plate 12 a predetermined amount. The roller 50 may protrude a shorter amount than the leg 40 while the cloth treating apparatus 1 is installed. When the cloth treating apparatus 1 is moved, the roller 50 may be in contact with the floor surface by adjusting a height of the leg 40 or tilting the cloth treating apparatus 1 and then may be rolled.

One pair of legs 40 may be provided at both of left and right sides of each of a first half portion and a second half portion of the base plate 12, and a spike fixing member 60 may be installed at each of the legs 40. The spike fixing member 60 may fix and install the cloth treating apparatus 1 and may transpierce a mat or carpet 2 spread on a floor of an installation space and thus to be fixed thereto. The spike fixing member 60 may include a coupling portion 61 which is coupled to the leg 40 and a spike 64 which transpierces and is inserted into the carpet 2.

The spike fixing member 60 may have a structure which is separably installed at the leg 40. Therefore, according to an installation environment of the cloth treating apparatus 1, when the cloth treating apparatus 1 is installed on a hard floor, the spike fixing member 60 may be separated and the cloth treating apparatus 1 may be installed using the leg 40. When the cloth treating apparatus 1 is installed on the carpet 2 or the mat, the cloth treating apparatus 1 may be installed with the spike fixing member 60 installed at the leg 40.

A water tray 70 to collect condensate water generated from the machinery chamber 20 may be provided under the base plate 12. The water tray 70 may be located at a space between the base plate 12 and the floor surface of an indoor space and may be fixed to the leg 40. The water tray 70 may be withdrawn forward, may be separated from the leg 40 and then may be installed again at the leg 40 after the condensate water collected in the water tray 70 is removed.

The water tray 70 may form a space which is in communication with an inside of the machinery chamber 20 to collect the condensate water and may include a leg accommodation portion 75 which enables the water tray 70 to be fixed to and installed at the leg 40. Hereinafter, a structure of each of the leg 40, the spike fixing member 60 and the water tray 70 will be described in detail.

Figure 5:
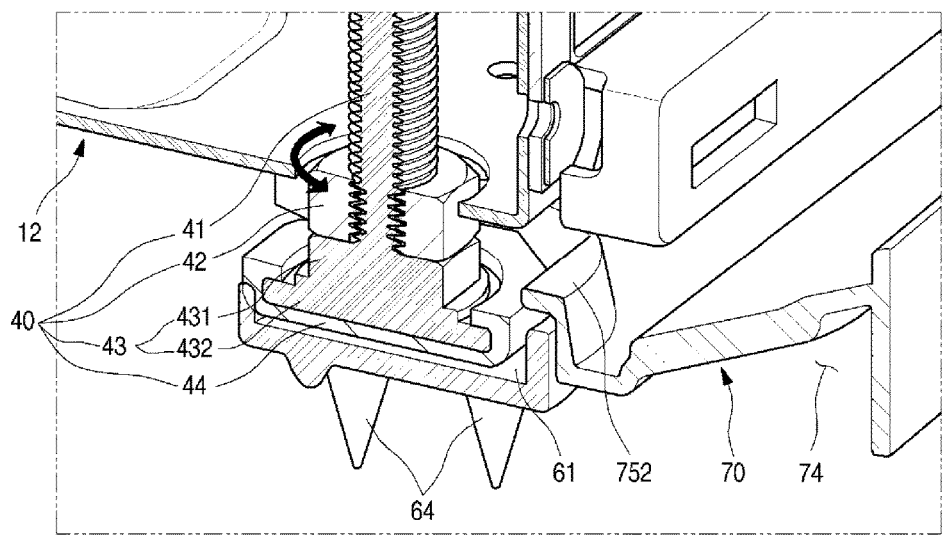
FIG. 5 is a cross-sectional view taken along line 5-5' of FIG. 2.

As illustrated in FIG. 5, the leg 40 may be provided at the base plate 12. The leg 40 may include a fixing nut 42 which is fixed to the base plate 12 or a frame inside the machinery chamber 20, an adjusting screw 41 which passes through the fixing nut 42 and is screw-coupled to the fixing nut 42, and a screw head 43 which is provided at a lower end of the adjusting screw 41.

When a user rotates the screw head 43 when the leg 40 is installed, the adjusting screw 41 may be moved up and down due to a screw-coupling with the fixing nut 42. The screw head 43 may have a nut portion 431 of which an upper portion is formed in a hexagonal or nut shape to allow a rotation operation to be easily performed.

A protruding length of the leg 40 may be adjusted by rotation of the adjusting screw 41, and thus a distance between the base plate 12 and the floor surface of the indoor space may be adjusted. A height of the cloth treating apparatus 1 may be adjusted through an operation of the leg 40, and a horizontal stability of the cloth treating apparatus 1 may be adjusted by adjusting each of the legs 40 provided at the four corners of the base plate 12.

Meanwhile, a base portion 432 which extends outward further than the nut portion 431 may be formed at a lower portion of the screw head 43. The base portion 432 and the nut portion 431 may be formed of separate members and may be coupled to each other, or may be integrally molded with the adjusting screw 41.

A base cover 44 which is in contact with the floor surface upon the installing of the cloth treating apparatus 1 may be formed at the base portion 432. The base cover 44 may surround the base portion 432 and may be formed of a plastic or rubber material. The base cover 44 may prevent slipping when in contact with the hard floor surface instead of the carpet 2 or the mat of the indoor space. The base cover 44 may be formed with the base portion 432 by an insert injection molding process when the leg 40 is molded. If necessary, the base cover 44 may be separately molded and then may be coupled to the base portion 432. The base cover 44 may be formed in a polygonal shape in which a plurality of surfaces are formed at a circumference thereof. Therefore, the height of the leg 40 may be adjusted by rotating the base cover 44.

The spike fixing member 60 may be coupled to a lower end of the leg 40. The spike fixing member 60 may be fitted to the lower end of the leg 40 and may be formed to be separable according to the floor surface of the indoor space.

Figure 6:
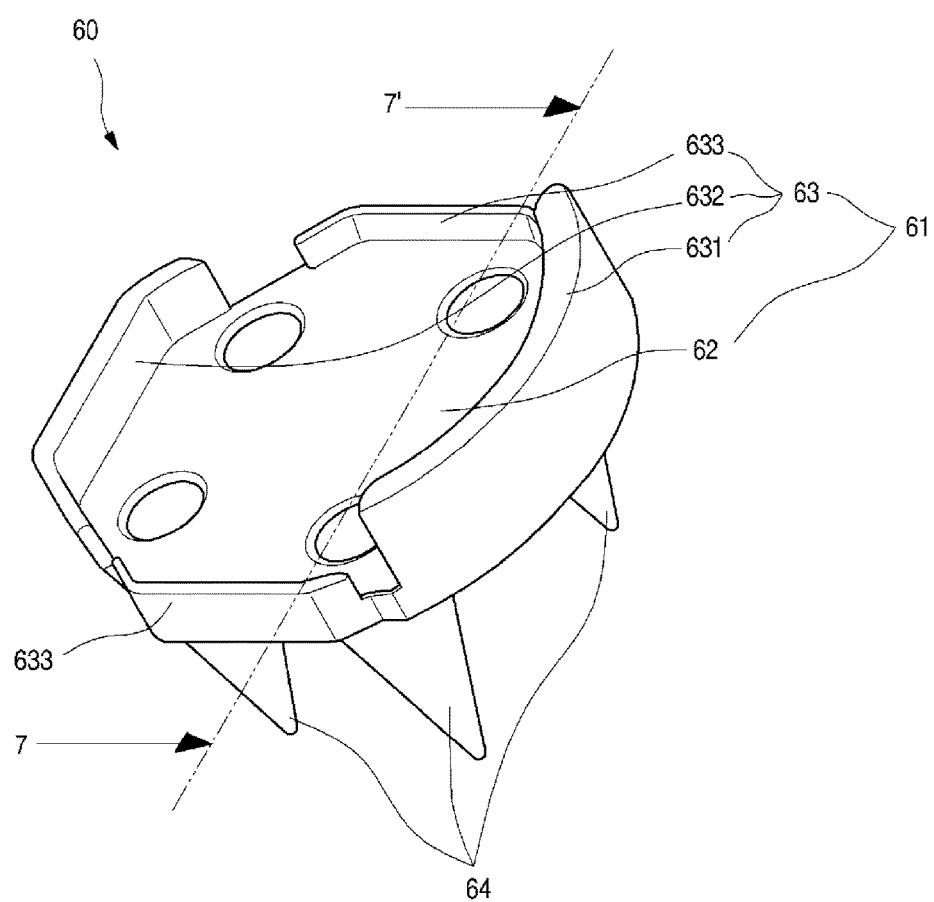
FIG. 6 is a perspective view of the spike fixing member.
Figure 7:
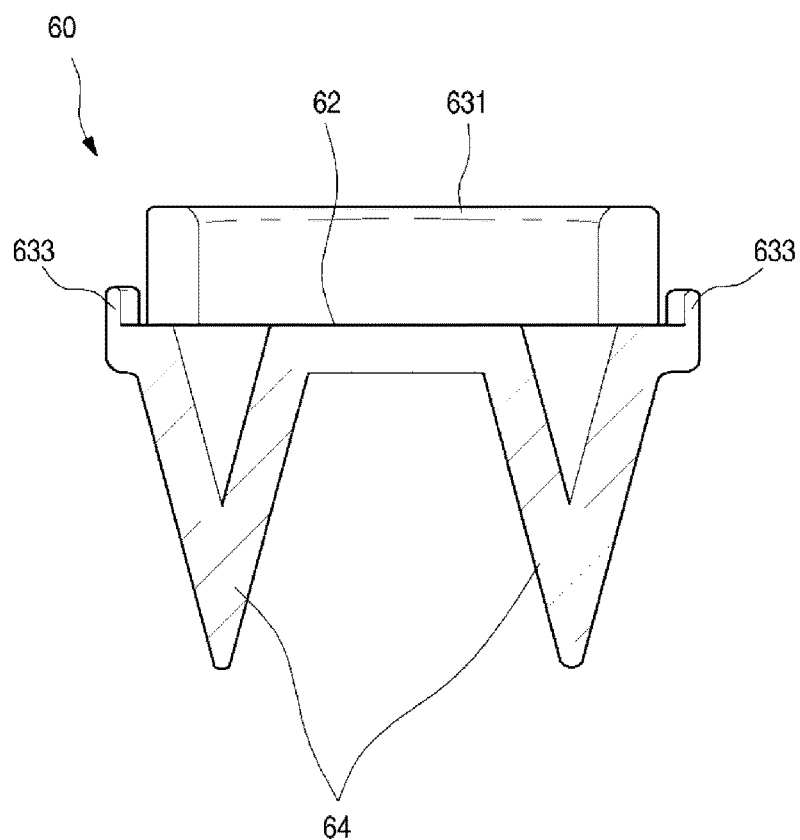
FIG. 7 is a cross-sectional view taken along line 7-7' of FIG. 6.

As illustrated in FIGS. 6 and 7, the spike fixing member 60 may generally include the coupling portion 61 which is coupled to the lower end of the leg 40, and the spike 64. Specifically, the coupling portion 61 may form an upper portion of the spike fixing member 60 and form a supporting surface 62 which may be in contact with a lower surface of the leg 40. The supporting surface 62 may have a size and shape which corresponds to or is slightly larger than the lower surface of the leg 40 and may be formed to support the leg 40 and to accommodate a part of a lower portion of the leg 40.

A rib 63 may be formed to protrude upward at an edge of the supporting surface 62. The rib 63 may allow the spike fixing member 60 to be coupled to not only the leg 40 but also the water tray 70. The rib 63 may include a first rib 631 provided at a front end (a right side in FIG. 6), a second rib 632 provided at a rear end (a left side in FIG. 6) facing the first rib 631, and one pair of third ribs 633 provided at both sides between the first rib 631 and the second rib 632.

The first rib 631 may be rounded along a front end of the supporting surface 62. A shape of the first rib 631 may correspond to an internal shape of the leg accommodation portion 75 of the water tray 70, such that the first rib 631 may be in close contact with an inside of the leg accommodation portion 75 when the water tray 70 is coupled. An extending height of the first rib 631 may be in contact with a seating portion 752 formed at the leg accommodation portion 75 when the water tray 70 is installed.

The second rib 632 may be formed along a rear end of the supporting surface 62, formed in a shape corresponding to an outer end of the leg 40, i.e., a shape of the base cover 44, and also formed to be in close contact with a side surface of the base cover 44. The second rib 632 may have a plurality of surfaces, thereby being in close contact with an outer surface of the base cover 44. The base cover 44 may be in close contact with and fixed to the second rib 632 when seated on the supporting surface 62 and may prevent the spike fixing member 60 from being separated from the leg 40 due to shaking.

The first rib 631 and the second rib 632 may be formed at a first half portion and a second half portion of the supporting surface 62, respectively, and both ends thereof may be spaced apart from each other. The third ribs 633 may be arranged at both sides of the supporting surface 62 between the first rib 631 and the second rib 632.

The third ribs 633 may be formed at both of left and right side ends of the supporting surface 62, respectively, located between the first rib 631 and the second rib 632 and formed to extend in a length which is spaced apart from the first rib 631 and the second rib 632. Each of the third ribs 633 may also have a plurality of surfaces, thereby being in close contact with the side surface of the base cover 44.

A height of each of the third ribs 633 may be lower than that of each of the first rib 631 and the second rib 632. An upper end of the third rib 633 may be lower than an elastic fixing portion 753 formed at the leg accommodation portion 75 not to interfere with the elastic fixing portion 753. The first rib 631, the second rib 632 and the third ribs 633 may be in contact with the base cover 44 when coupled to the leg 40, and at least the second rib 632 and the third ribs 633 may be completely in contact with a circumferential surface of the base cover 44, and thus the spike fixing member 60 may be coupled to the leg 40.

The first rib 631, the second rib 632 and the third ribs 633 may be spaced apart from each other and elastically deformed outward when the spike fixing member 60 is attached, and thus the leg 40 may be fitted and fixed. A lower surface of the base cover 44 may be in contact with the supporting surface 62, and the circumferential surface of the base cover 44 may be in contact with and restricted by the first rib 631, the second rib 632, and the third ribs 633, respectively.

A plurality of spikes 64 which extend downward may be provided at a lower surface of the supporting surface 62. The spikes 64 extend to transpierce or penetrate the carpet 2 and may be formed in a cone shape of which a diameter becomes smaller outward.

The spikes 64 may be formed by recessing downward one side of the supporting surface 62, thereby being easily injection-molded. That is, the spikes 64 may be formed to extend downward, and thus grooves recessed toward the spikes 64 may be formed at corresponding positions of the supporting surface 62. As illustrated in FIG. 6, four spikes 64 may be formed to be evenly distributed on the lower surface of the supporting surface 62. The number of spikes 64 may be randomly formed.

Figure 8:
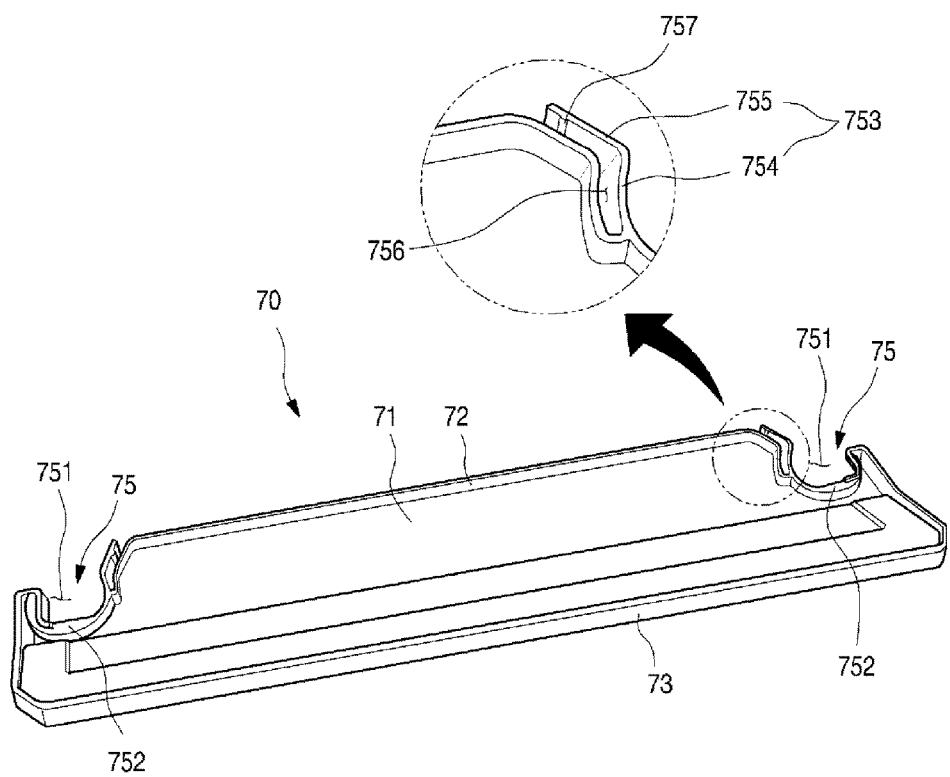
FIG. 8 is a perspective view of the water tray.
Figure 9:
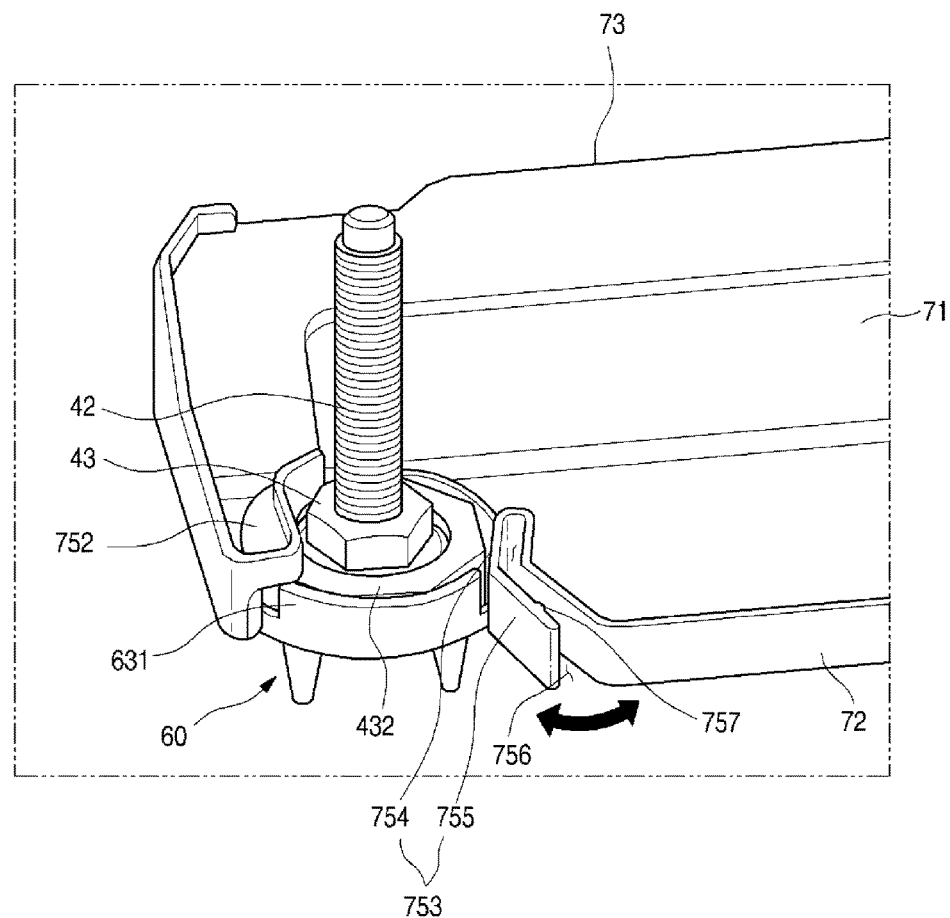
FIG. 9 is a partial perspective view illustrating a state in which the water tray is installed at a leg.

As illustrated in FIGS. 8 and 9, the water tray 70 may have a water collecting space formed therein by a flange 72 formed along a perimeter of a lower surface 71 of the water tray 70. A front surface 73 of the water tray 70 may be exposed through a space between the cabinet 10 and the indoor floor surface. The front surface 73 of the water tray 70 may be covered by the door 30 when the door 30 is closed.

A handle 74 (in FIG. 5) may be formed at a first half portion of the lower surface 71 of the water tray 70. A lower surface of the handle 74 may be recessed upward and may be formed by a space formed by the front surface 73 and the lower surface 71. When the user inserts his/her hand into the handle 74 and then pulls the handle 74 forward, the water tray 70 may be withdrawn forward.

The leg accommodation portion 75 may be recessed from both sides of a rear end of the water tray 70. The leg accommodation portion 75 may have a corresponding shape and may thus to be coupled to the leg 40 while the leg 40 or the spike fixing member 60 is installed.

Specifically, the leg accommodation portion 75 may be recessed backward as a shape into which the base cover 44 of the leg 40 may be inserted. The leg accommodation portion 75 may be opened forward, and thus when the water tray 70 is inserted between the cabinet 10 and the floor surface of the indoor space from a front of the cabinet 10, the leg 40 may be smoothly inserted into the leg accommodation portion 75 through an opening 751 of the leg accommodation portion 75.

The seating portion 752 which protrudes inside the leg accommodation portion 75 may be formed at an upper end of the leg accommodation portion 75. The seating portion 752 may protrude upward, then may protrude inside the leg accommodation portion 75 and thus may be seated on the screw head 43 or the base cover 44 of the leg 40 when the water tray 70 is installed. The water tray 70 may be installed while being hung from the leg 40. The seating portion 752 may protrude inside the leg accommodation portion 75 not to interfere with the adjusting screw 41 when the leg 40 is inserted and withdrawn, and may be formed at only a partial section along the upper end of the leg accommodation portion 75.

The elastic fixing portion 753 may extend outward from one end of the leg accommodation portion 75. The elastic fixing portion 753 may be spaced apart from one side of the flange 72 of the water tray 70 and may extend while maintaining a predetermined space 756 along with the flange 72. The elastic fixing portion 753 may be formed in a plate shape and may have a structure which is elastically deformed when the leg 40 is inserted and withdrawn.

When the leg 40 is inserted into the leg accommodation portion 75, the elastic fixing portion 753 may be elastically deformed and thus the leg 40 may be inserted into the opening 751 of the leg accommodation portion 75. When the leg 40 is completely accommodated in the leg accommodation portion 75, the leg 40 may be pressed and fixed by an elastic force. Due to such a structure, the water tray 70 may be installed at and fixed to the leg 40 while the water tray 70 is installed at the leg 40 or although the water tray 70 is not installed at the leg 40.

When the water tray 70 is withdrawn to be separated, the elastic fixing portion 753 may be deformed again, and thus the leg 40 may also be withdrawn through the opening 751 of the leg accommodation portion 75. The elastic fixing portion 753 may include a fixing portion 754 for fixing the leg 40 and a guide portion 755 which is in contact with the leg 40 and guides an insertion of the water tray 70.

An end of the fixing portion 754 may be located at one end of the leg accommodation portion 75 and extend outward. The fixing portion 754 may form a part of the leg accommodation portion 75. The fixing portion 754 may press and fix an outer surface of the leg 40 when the leg 40 is accommodated in the leg accommodation portion 75.

Accordingly, the fixing portion 754 may press and fix a side surface of the leg 40 through an upper side of the third rib 633 of the spike fixing member 60. The fixing portion 754 may extend in a direction in which the opening 751 of the leg accommodation portion 75 becomes narrower. A width of the opening 751 may be formed smaller than that of the lower end of the leg 40. Therefore, the fixing portion 754 may be elastically deformed outward while the leg 40 passes through the opening 751 to be inserted inside the leg accommodation portion 75.

The guide portion 755 may extend further from an end of the fixing portion 754 and may extend in a direction that crosses an extending direction of the fixing portion 754. The guide portion 755 may extend in a direction opposite to the extending direction of the fixing portion 754. While the leg 40 is inserted into the leg accommodation portion 75, the guide portion 755 may be in contact with the leg 40, and the leg 40 may be naturally directed toward the opening 751 and may be inserted inside the leg accommodation portion 75. In this process, the elastic fixing portion 753 may be elastically deformed outward. An elastic restoring force may be generated, and the leg 40 may be pressed and fixed by the elastic restoring force.

A stop protrusion 757 which protrudes to be in contact with the flange 72 when the guide portion 755 is elastically deformed may be formed at an outer surface of the guide portion 755. The stop protrusion 757 may prevent the guide portion 755 from being excessively deformed and damaged due to a contact with the leg 40 when the water tray 70 is installed and allow the elastic fixing portion 753 to be deformed to a proper displacement, thereby preventing the elastic fixing portion 753 from being damaged.

Hereinafter, an installation state of the cloth treating apparatus 1 having the above-described configuration will be described in detail with reference to the drawings. When the indoor floor surface on which the cloth treating apparatus 1 is installed is a hard tile or floor, the cloth treating apparatus 1 may not include the spike fixing member 60. The indoor floor surface may thus be supported by the leg 40. The user may adjust the height of the leg 40 so that the cloth treating apparatus 1 is in a horizontal state and is not shaken due to vibration generated while being operated.

Figure 10:
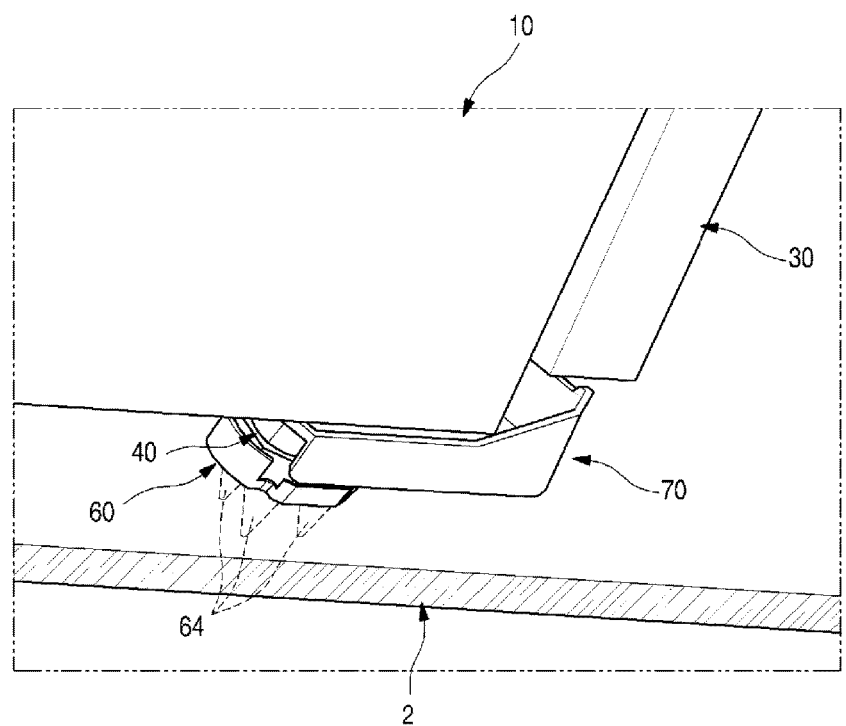
FIG. 10 is a partial perspective view illustrating a corner of a first half portion of a lower end of the cloth treating apparatus.
Figure 11:
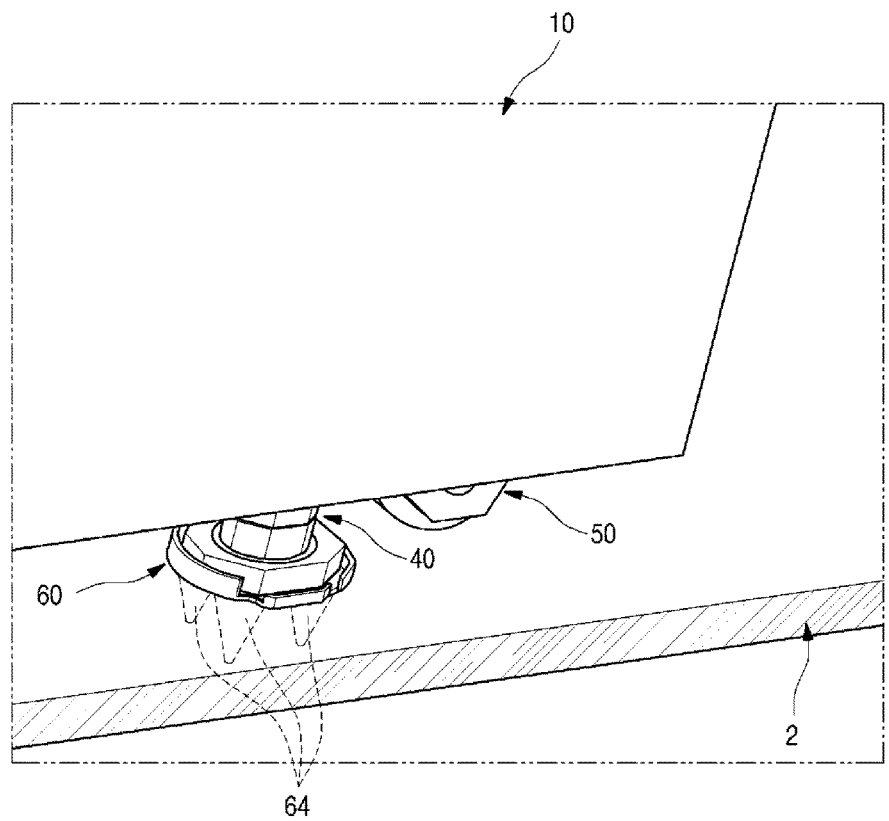
FIG. 11 is a partial perspective view illustrating a corner of a second half portion of the lower end of the cloth treating apparatus.

When the indoor floor surface is formed of soft carpet 2, the user may install the cloth treating apparatus 1 to include the spike fixing member 60 at the leg 40, thereby stably installing the cloth treating apparatus 1, as illustrated in FIGS. 10 and 11. Since the spike fixing member 60 may be located at a bottom surface of the leg 40, the plurality of spikes 64 which extend from a bottom of the spike fixing member 60 may transpierce the carpet 2.

Since the spike fixing member 60 may be provided at each of the four corners of the base plate 12, the entire cloth treating apparatus 1 may be maintained in a stably installed state on the carpet 2. Since the spike fixing member 60 among the plurality of spike fixing members 60 which is located at the second half portion near the roller 50 has a structure which extends downward further than the roller 50, the cloth treating apparatus 1 may be maintained in the stably fixed and installed state.

When the cloth treating apparatus 1 is installed, the water tray 70 may be installed at and fixed to the leg 40. The water tray 70 may be located at a space between the base plate 12 and the carpet 2 and may collect the condensate water generated from the machinery chamber 20. If necessary, the user may separate the water tray 70 and may remove the collected condensate water.

Figure 12:
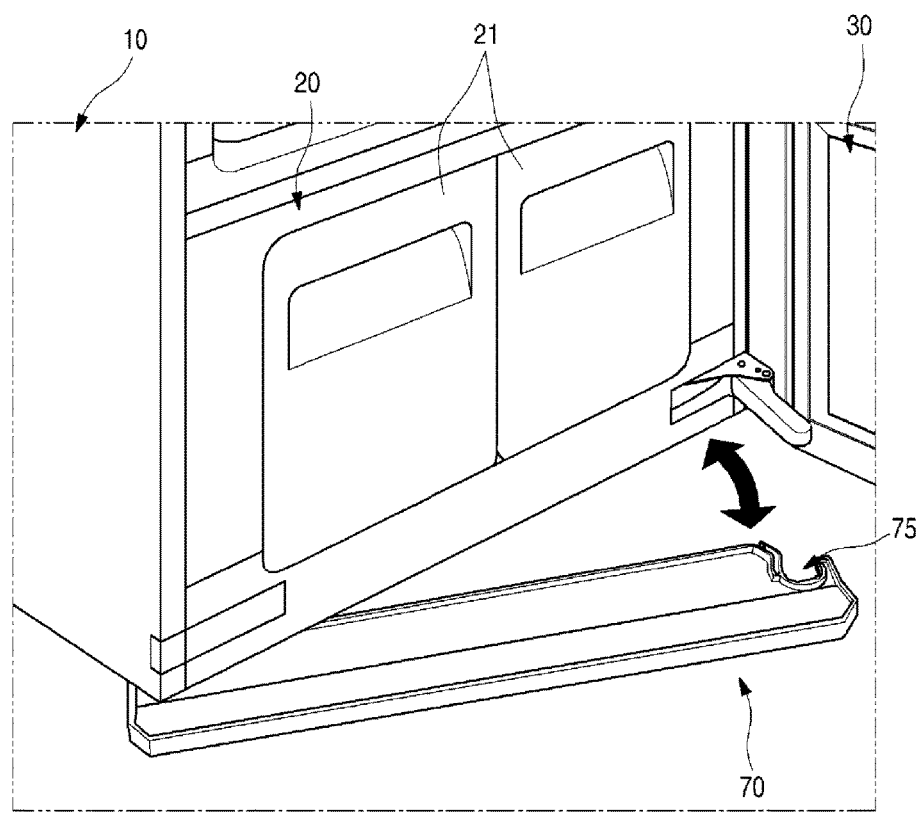
FIG. 12 is a view illustrating a process of installing and separating the water tray.
Figure 13:
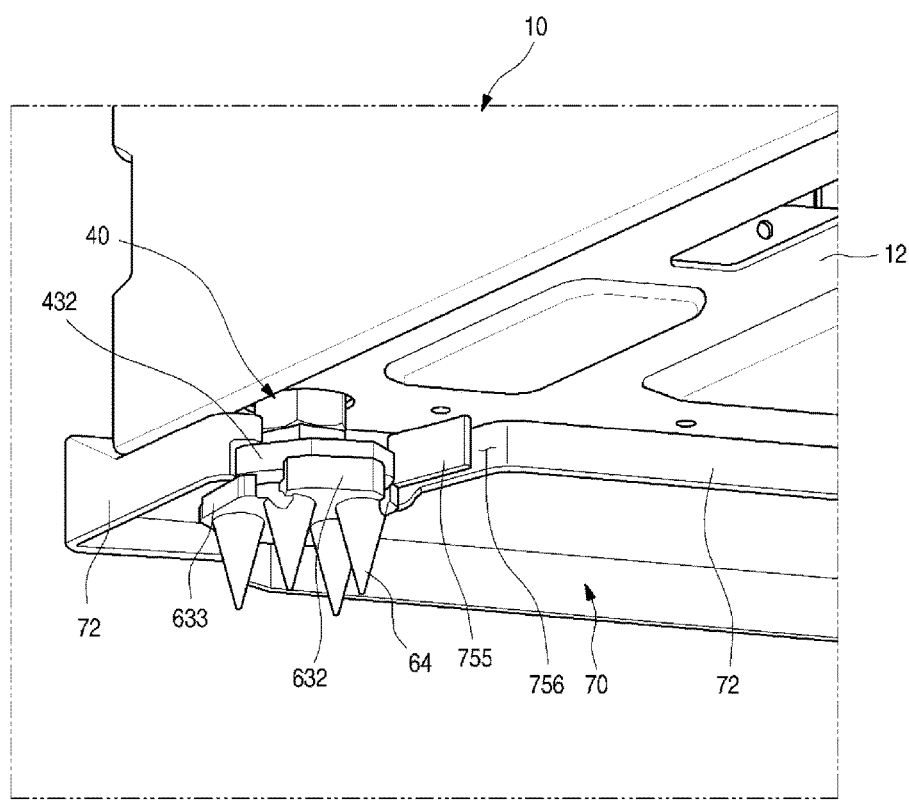
FIG. 13 is a partial perspective view illustrating a state in which the spike fixing member and the water tray are installed.

As illustrated in FIGS. 12 and 13, when the cloth treating apparatus 1 is installed, the water tray 70 may be inserted into and installed at the space between the lower surface of the cabinet 10, i.e., the base plate 12 and the indoor floor surface. The water tray 70 may be shielded while the door 30 is closed. Accordingly, the water tray 70 may be installed and separated while the door 30 is opened.

To install the water tray 70, a rear surface of the water tray 70 at which the leg accommodation portion 75 may be formed is pushed toward the leg 40. When the water tray 70 is pushed while a position thereof is aligned under the cabinet 10, the leg 40 may be inserted into the leg accommodation portion 75.

As illustrated in FIG. 12, one of both legs 40 may be first inserted into the leg accommodation portion 75, and then the water tray 70 may be rotated about the inserted and installed leg 40 so that the other leg 40 may be inserted into the leg accommodation portion 75. The leg 40 may be moved to the opening 751 of the leg accommodation portion 75 through the guide portion 755 when being inserted into the leg accommodation portion 75. The elastic fixing portion 753 may be elastically deformed, and thus the leg 40 may be inserted into the leg accommodation portion 75.

While the leg 40 is inserted into the leg accommodation portion 75, the elastic fixing portion 753 may press and fix one side of the leg 40, and thus the water tray 70 may be maintained in an installed state to the leg 40. While the leg 40 is completely accommodated in the leg accommodation portion 75, the seating portion 752 formed at the leg accommodation portion 75 may be located above the base cover 44 of the leg 40, and the seating portion 752 may be seated on and supported by the base cover 44 or an upper surface of the screw head 43. Therefore, the water tray 70 may be maintained in an installed state to the leg 40. To remove the condensate water collected in the water tray 70, the water tray 70 may be separated from the leg 40, and the separating and the installing thereof may be performed through the above-described processes.

The spike fixing member and the cloth treating apparatus having the same according to the present disclosure may have the following effects. First, the spike fixing member may have a structure which is fitted to the leg of a home appliance by a plurality of ribs, and thus may be installed at various home appliances which are installed on carpet spread on an indoor floor surface so that the home appliances may be stably installed and fixed. Second, since the present disclosure has a structure in which the water tray is provided at the space between the cabinet and the floor surface and seated at the leg, it may not be necessary to provide a separate space for installing the water tray, and thus space utilization may be enhanced.

Third, since the water tray installation portion is formed at both sides of the water tray and the water tray has a structure which is separably installed at the leg, use convenience may be enhanced. Fourth, in the installation of the water tray, the shape of the rib may not interfere with the water tray even while the spike fixing member is installed at the leg, and thus the water tray may be installed and separated even when the spike fixing member is installed.

A spike fixing member which is installed at a leg for supporting a cabinet and allows the cabinet to be stably fixed and installed on carpet, and a cloth treating apparatus having the same are disclosed. The spike fixing member may be easily separably installed at a leg for supporting a cabinet.

A spike fixing member may allow a cabinet to be stably fixed and installed on carpet and also allows a water tray for accommodating condensate water to be easily installed and separated. A spike fixing member may prevent a loss of a cloth accommodation space and effectively collects condensate water.

A spike fixing member may include a coupling portion provided at a lower surface of a home appliance and coupled to a lower end of a leg for supporting the home appliance; and a plurality of spikes formed to extend downward from a lower surface of the coupling portion and configured to transpierce and be inserted into carpet provided at an indoor space. The coupling portion may include a supporting surface which is in contact with and supports a lower surface of the leg, and a rib which extends along a perimeter of the supporting surface to be in contact with a side surface of the leg.

A plurality of ribs may be continuously disposed to be spaced apart from each other at regular intervals, and the leg may be fitted to the coupling portion to be in contact with an inner surface of each of the ribs. A plurality of surfaces may be continuously formed at an outer surface of the leg, and each of the ribs may be formed to be in contact with at least two surfaces of the outer surface of the leg.

The ribs may include a first rib which is exposed when the spike fixing member is coupled and formed to be rounded; a second rib which is formed at a position facing the first rib and formed to be bent to be in contact with the plurality of surfaces of the leg when being installed; and one pair of third ribs which are formed at both side ends between the first rib and the second rib which are spaced apart from each other and also formed to be bent to be in contact with the plurality of surfaces of the leg. The spike fixing member may be injection-molded with a resin material, and a part of the supporting surface corresponding to the spikes may be recessed.

A cloth treating apparatus may further include a cabinet configured to form a cloth accommodation space, and opened and closed by a door; a machinery chamber provided at the cabinet and configured to accommodate at least some of elements forming a refrigeration cycle; a leg provided at a lower surface of the cabinet and configured to support the cabinet on a floor surface of an indoor space; a water tray disposed between the cabinet and the bottom surface and separably installed at the leg to collect condensate water generated from the machinery chamber; and a spike fixing member separably provided at the leg and having a plurality of spikes which transpierce and are inserted into carpet disposed on the floor surface. A leg accommodation portion recessed to form a space for accommodating the leg may be formed at both sides of the water tray.

A seating part which extends inside the leg accommodation portion to be in contact with an upper surface of the leg and allows the water tray to be seated at the leg may be formed at the leg accommodation portion. An elastic fixing portion which extends toward an opening of the leg accommodation portion and maintains an installed state of the water tray at the leg by elastically pressing a side surface of the leg may be provided at one side of the leg accommodation portion.

The elastic fixing portion may be formed to extend from one end of the leg accommodation portion and may be formed in a plate shape which is spaced apart from a flange of the water tray to be elastically deformed. The elastic fixing portion may include a fixing portion which extends from the leg accommodation portion so that the opening of the leg accommodation portion is narrower than a width of the leg; and a guide portion which extends from an end of an extending portion in a direction crossing an extending direction of the extending portion and guides movement of the leg by being in contact with the leg when the water tray is installed.

A stop protrusion which protrudes toward the flange may be formed at the guide portion. The spike fixing member may further include a supporting surface which supports the leg, and a coupling portion which is configured with a plurality of ribs which extend from a perimeter of the supporting surface to be in contact with a side surface of the leg and thus to form a space into which the leg is fitted.

The ribs may include a first rib which is in close contact with an inner surface of the leg accommodation portion; a second rib which extends from a position facing the first rib to surround a circumference of the leg; and a third rib which is located between the first rib and the second rib which are spaced apart from each other to support a side surface of the leg. The first rib may be exposed to an opened side surface of the leg accommodation portion and may be formed to be rounded. The elastic fixing portion may be caught and restricted between the first rib and the third rib.

The second rib and the third rib may be formed to be in close contact with at least two or more surfaces of a circumferential surface of the leg formed in a polygonal shape. The third rib may protrude to have a height lower than that of each of the first rib and the second rib and thus not to interfere with the elastic fixing portion of the water tray. One side of the supporting surface corresponding to positions of the spikes may be formed to be recessed.

Any reference in this specification to "one embodiment," "an embodiment," "example embodiment," etc., means that a particular feature, structure, or characteristic described in connection with the embodiment is included in at least one embodiment of the disclosure. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:
1. A cloth treating apparatus comprising:
a cabinet configured to form a cloth accommodation space, the cabinet being opened and closed by a door;
a machinery chamber provided at the cabinet and configured to accommodate at least some of elements forming a refrigeration cycle;
a plurality of legs provided at a lower surface of the cabinet and configured to support the cabinet on a floor surface of an indoor space, wherein the plurality of legs includes a first leg and a second leg;

a water tray provided between the cabinet and the floor surface and separably installed at the first and second legs to collect condensate water generated from the machinery chamber; and a spike fixing member separably provided at each of the plurality of legs and having a plurality of spikes which transpierce and are inserted into a carpet surface, wherein the water tray comprises leg accommodation portions recessed to form a space to accommodate the first and second legs, the leg accommodation portions being formed at either side of the water tray, and wherein an elastic fixing portion which extends toward an opening of each of the leg accommodation portions and maintains an installed state of the water tray at the first and second legs by elastically pressing a side surface of the first or second leg is provided at one side of each of the leg accommodation portions.

2. The cloth treating apparatus according to claim 1, wherein a seating part which extends inside each of the leg accommodation portions to be in contact with an upper surface of the first or second leg and allows the water tray to be seated at the first or second leg is formed at each of the leg accommodation portions.

3. The cloth treating apparatus according to claim 1, wherein the elastic fixing portion is formed to extend from one end of each of the leg accommodation portions and formed in a plate shape which is spaced apart from a flange of the water tray to be elastically deformed.

4. The cloth treating apparatus according to claim 3, wherein the elastic fixing portion includes a fixing portion which extends from each of the leg accommodation portions so that the opening of each of the leg accommodation portions is narrower than a width of the leg; and a guide portion which extends from an end of an extending portion in a direction crossing an extending direction of the extending portion and guides movement of the first or second leg by being in contact with the first or second leg when the water tray is installed.

5. The cloth treating apparatus according to claim 4, wherein a stop protrusion which protrudes toward the flange is formed at the guide portion.

6. The cloth treating apparatus according to claim 1, wherein the spike fixing member further includes a supporting surface that supports the first or second leg, and a coupling portion which includes a plurality of ribs that extend from a perimeter of the supporting surface to be in contact with a side surface of the first or second leg and thus to form a space into which the first or second leg is fitted.

7. The cloth treating apparatus according to claim 6, wherein the ribs include a first rib in close contact with an inner surface of each of the leg accommodation portions; a second rib extending from a position facing the first rib to surround a circumference of the first or second leg; and a third rib located between the first rib and the second rib which are spaced apart from each other to support a side surface of the first or second leg.

8. The cloth treating apparatus according to claim 7, wherein the first rib is exposed to an opened side surface of each of the leg accommodation portions and is formed to be rounded.

9. The cloth treating apparatus according to claim 7, wherein the elastic fixing portion is caught and restricted between the first rib and the third rib.

10. The cloth treating apparatus according to claim 7, wherein the second rib and the third rib are formed to be in close contact with at least two or more surfaces of a circumferential surface of the first or second leg formed in a polygonal shape.

11. The cloth treating apparatus according to claim 7, wherein the third rib protrudes lower than that of each of the first rib and the second rib and thus not to interfere with the elastic fixing portion of the water tray.

12. The cloth treating apparatus according to claim 6, wherein one side of the supporting surface corresponding to positions of the spikes is formed to be recessed.

* * * * *